Sept. 26, 1967     B. R. WANLASS     3,343,303
VEHICLE BODY DECK LID OPERATING SYSTEM
Filed July 27, 1965     4 Sheets-Sheet 1

INVENTOR.
Bert R. Wanlass
BY
W. S. Pettigrew
ATTORNEY

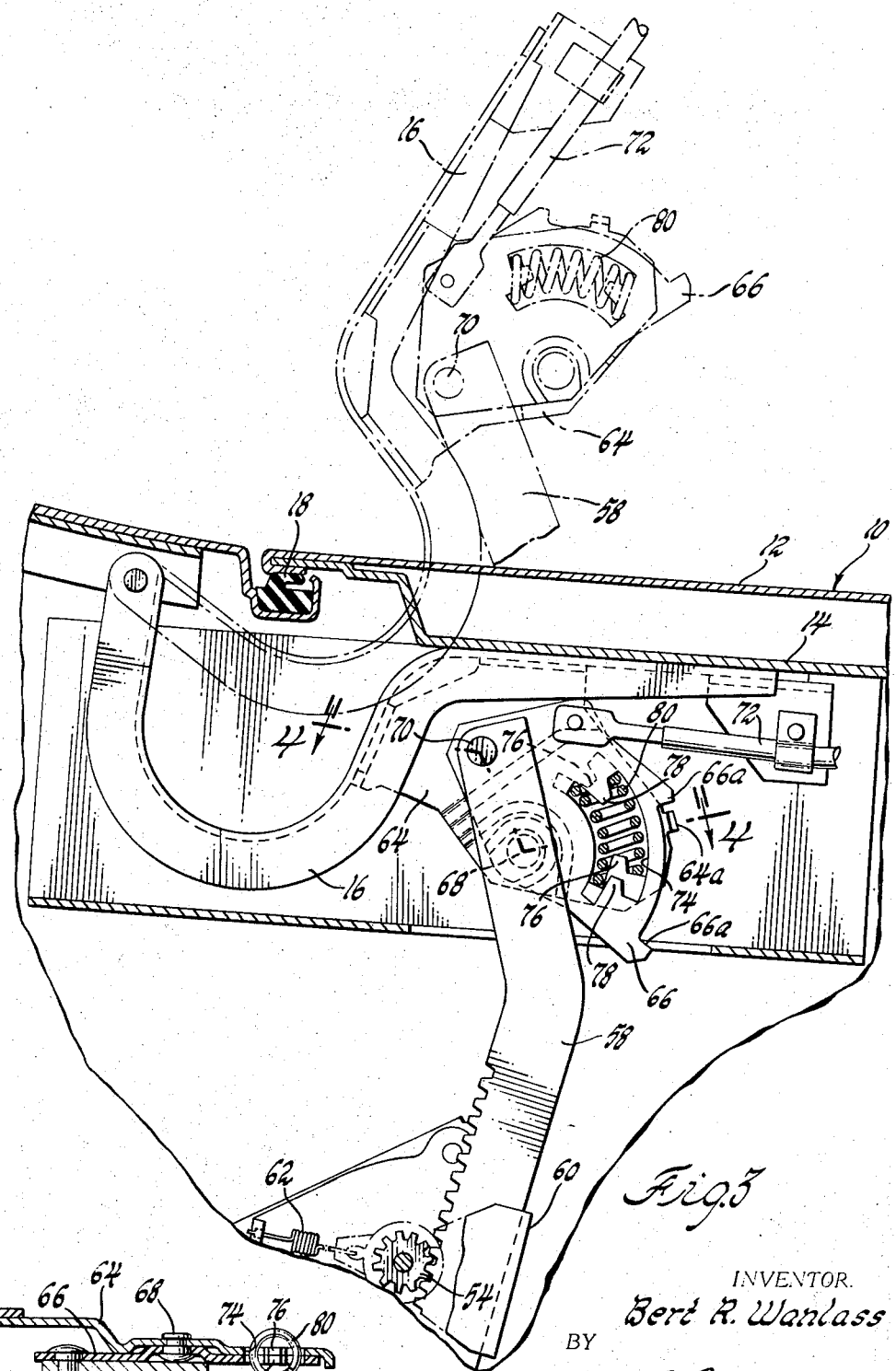

INVENTOR.
Bert R. Wanlass
BY W. S. Pettigrew
ATTORNEY

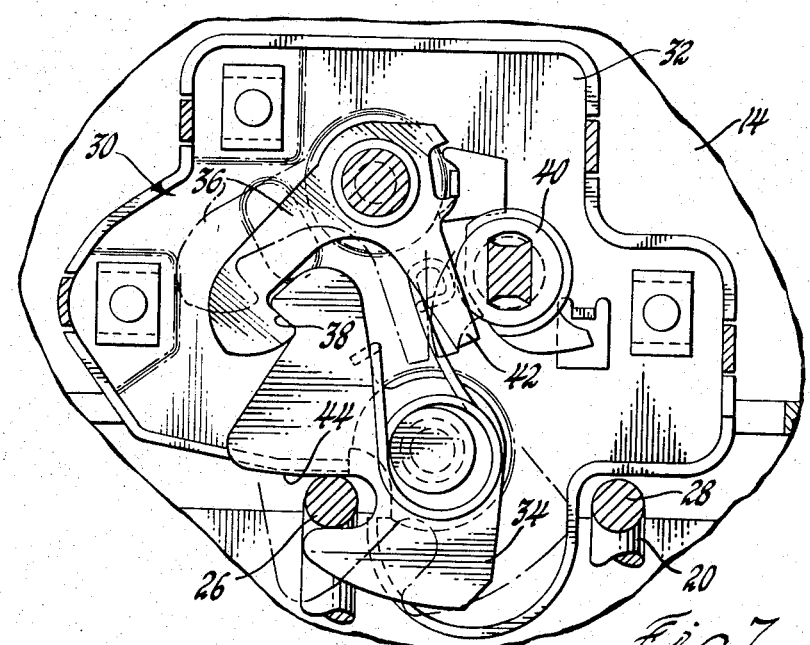
Fig. 7
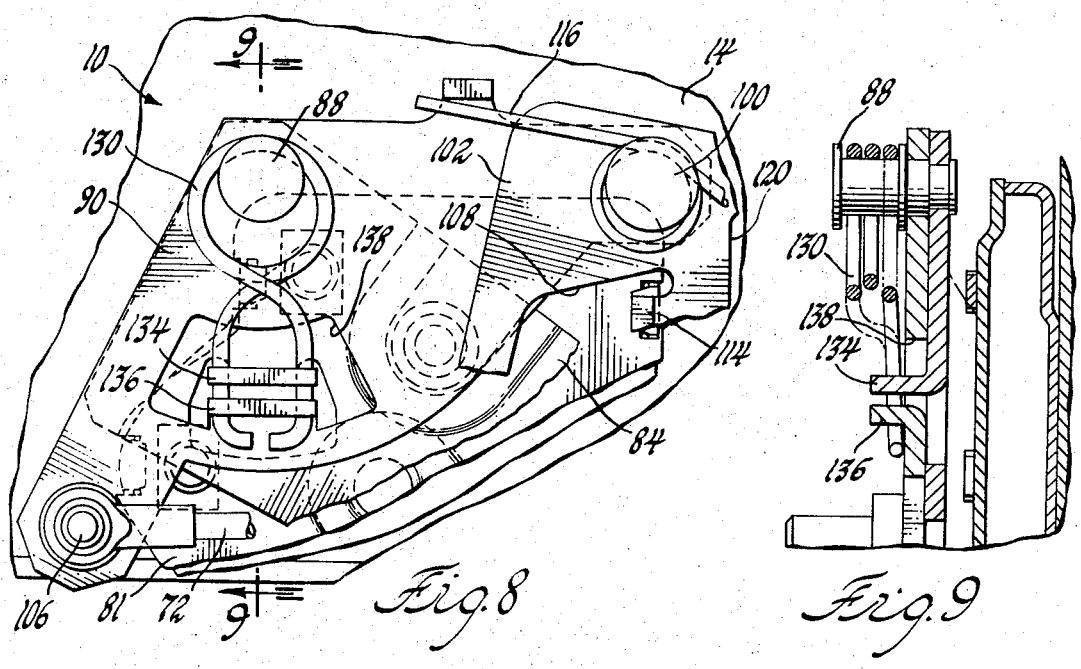
Fig. 8
Fig. 9
INVENTOR.
Bert R. Wanlass
BY
*W.S. Pettigrew*
ATTORNEY United States Patent Office 3,343,303
Patented Sept. 26, 1967

3,343,303
VEHICLE BODY DECK LID OPERATING
SYSTEM
Bert R. Wanlass, Warren, Mich., assignor to General
Motors Corporation, Detroit, Mich., a corporation of
Delaware
Filed July 27, 1965, Ser. No. 475,184
11 Claims. (Cl. 49—280)

ABSTRACT OF THE DISCLOSURE

An operating system for a vehicle body deck lid or the like includes a power actuator unit mounted on the body and having a pinion driven rack connected to the deck lid to move the latter between its various positions, and a pull-down grapnel hook lever mounted on a generally conventional latch unit on the deck lid and movable relative thereto between retracted and extended positions in which latter it is engageable with the latch striker unit on the body when the deck lid is in a partially open position engaged with the body seal strip. The rack and pinion actuator and the hold-down grapnel hook lever are mechanically interconnected by a spring centered lost motion linkage operative to transfer output forces from the actuator to the grapnel hook lever when deck lid movement by the actuator in either direction is resisted by the seal strip or the deck lid latch. In the opening sequence, the lost motion linkage transfers actuator output power to the grapnel hook lever to cause the latter to move and operate a latch release member causing unlatching of the deck lid for subsequent opening movement by the actuator. In the closing sequence, seal strip resistance in the last stages of closing movement causes actuator output power to be transmitted through the lost motion connecting linkage to move the grapnel hook lever from a normal extended position to a retracted position relative to the latch unit whereby the grapnel hook lever engages the latch striker and pulls the deck lid to fully closed position wherein the latch and striker becomes interengaged.

The invention provides a complete operating system for a vehicle body deck lid or other closure thereof and operable to perform all opening and closing sequences completely automatically. Generally, the system includes power-operated actuating means for moving the closure between fully open and fully closed positions, latch means for securing the closure in fully closed position together with release means selectively operable upon the latch means, high output pulldown means operable to finally move the closure into fully closed position against the reaction forces of a seal strip or other resistance, and means for operatively interconnecting the various components for precisely sequenced and efficient operation. Contrary to systems proposed heretofore, the interconnecting means of this invention is provided by simple and economical mechanical linkage rather than complicated and expensive multiple electric motor and switch circuits.

The primary object of this invention is to provide a new and improved vehicle body closure operating system. Another object of this invention is to provide a new and improved vehicle body deck lid operating system including power-operated actuator means for moving the closure between fully open and fully closed positions, high output closure pulldown means operable to move the closure from a partially open position to fully closed position, latch release means for selectively releasing the closure latch means, and means for operatively interconnecting the actuator means with the pulldown means and with the latch release means for sequential operation thereof under selected operation of the actuator means. Another object of this invention is to provide a closure operating system according to the foregoing wherein the interconnecting means take the form of relatively simple and economical mechanical linkage having lost motion sequencing provisions. Yet another object of this invention is to provide a new and improved closure pulldown apparatus including grapnel hook means mounted either on the vehicle body or the closure for bodily shiftable movement between an extended position, wherein the grapnel means is engageable with coopertaing keeper means when the closure is in a partially open position, and a retracted position moving the closure from the partially open to the fully closed position thereof for latching of the closure latch means.

These and other objects, features and advantages of the invention will be readily apparent from the following specifications and drawings wherein:

FIGURE 3 is a further enlarged view of a portion of FIGURE 2, but showing the actuator and associated parts in a different position in solid lines;

FIGURE 4 is a sectional view taken generally along the line 4—4 of FIGURE 3;

FIGURE 7 is an enlarged sectional view taken generally along the plane indicated by line 7—7 of FIGURE 2;

FIGURE 8 is a view similar to a portion of FIGURE 5 showing a modification; and

FIGURE 9 is a sectional view taken generally along the plane indicated by line 9—9 of FIGURE 8.

Figure 1:
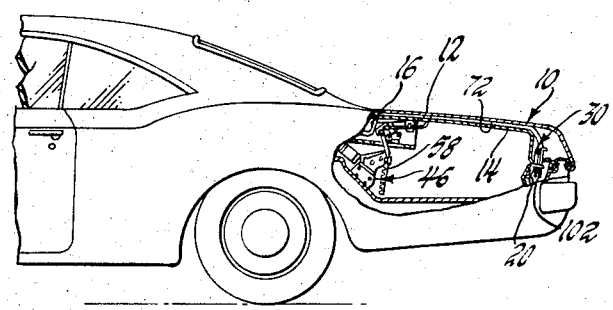
FIGURE 1 is a fragmentary partially broken away elevational view of a vehicle body including a closure operating system according to this invention.
Figure 2:
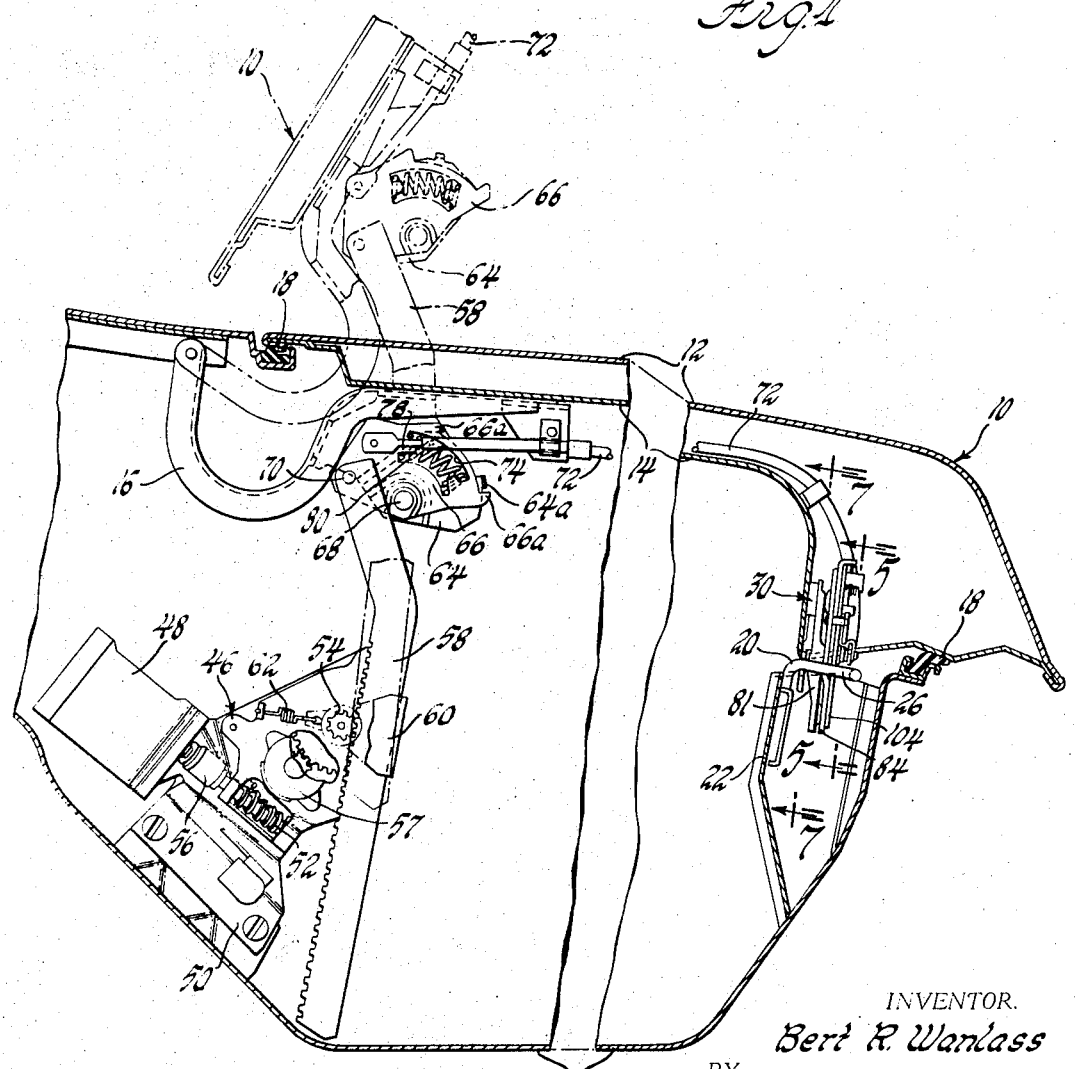
FIGURE 2 is an enlarged view of a portion of FIGURE 1 showing the vehicle body deck lid in fully closed and fully open positions in solid and broken lines respectively.

Referring now particularly to FIGURES 1 and 2 of the drawings, the operating system of this invention is shown as applied for operation of a vehicle body deck lid 10. The deck lid is of conventional construction and includes an outer panel 12 and a reinforcing inner panel 14 hem-flanged together at the marginal edges of the deck lid. A transversely spaced pair of conventional gooseneck hinge members 16 are each pivotally mounted at one end on the adjacent tulip panel structure of the body and have their legs bolted or otherwise secured to the under surface of panel 14 to mount deck lid 10 for forward swinging movement between a fully closed position as shown in solid lines and a fully open position indicated in broken lines. As the two hinge members are identical, only the one adjacent the right hand side of the vehicle body is shown.

In its fully closed position, the deck lid adjacent its marginal edges engages a seal strip 18 of conventional design located in suitable channel means provided about the periphery of the deck opening. A striker bar 20 of initial generally U-shaped configuration has its legs secured by a bracket to a box-like reinforcing member 22 welded to the rearward floor pan structure 24 of the body adjacent the rearward transverse edge of the deck opening, the striker bar having been bent to provide opposite rearwardly extending keeper portions 26 and 28 for cooperation with a deck lid latch and a pulldown grapnel hook lever, as will be hereinafter described. As seen best in FIGURE 7, a closure latch 30 is mounted to the rearward face of the rearward portion of panel 14 and extends through an aperture therein for cooperation with striker 20. Reference may be had to U.S. Patent 2,886,-

365, issued to R. M. Fox et al., for a complete description of the type of latch shown herein, but generally, the latch includes a frame 32, a fork bolt 34 mounted for rotation between latched and unlatched positions as indicated respectively in solid and broken lines, a spring-biased detent lever 36 swingable between a detenting position in engagement with a shoulder 38 on bolt 34 and a released position, and a rollback cam 40 rotatable into engagement with an arm 42 of detent lever 36 to release the detent lever from the bolt. When deck lid 10 is moved to fully closed position, a shoulder 44 on bolt 34 initially engages keeper portion 26 to rotate the bolt about the keeper portion and into latched position, wherein the deck lid is held against movement until cam 40 is rotated to release detent lever 36.

Referring to FIGURES 1 through 4, an actuator mechanism 46 for moving deck lid 10 between its various positions includes a reversible DC electric motor 48 suitably mounted on a support bracket 50 secured to floor pan 24 adjacent the right hand side of the body, the motor being adapted to drive through a reduction gearing 52 and to an output pinion 54. Gearing 52 may be of any desired type but as preferred, includes a flexible coupling 56 connecting the output of motor 48 with a worm, worm wheel, and spur gear connected to the pinion 54. Gearing 52 also preferably includes a conventional solenoid actuated dog clutch 57 intermediate the worm wheel and spur gear, or other means providing for reversibility in the event of a power failure. As seen best in FIGURE 3, pinion 54 is meshingly engaged with a toothed rack member 58 receiving on its edge opposite the pinion a biasing shoe member 60 which is vertically restrained but capable of laterally pressing the rack 58 against pinion 54 under the action of a coiled tension spring 62 anchored to bracket 50. The right hand hinge member 16 has welded or otherwise secured thereto a support bracket 64 which has rotatably mounted thereon a bell crank member 66 at a pivot stud 68. The upper end of rack 58 is pivotally connected by a stud 70 to one end portion of the bellcrank, and the bellcrank has further mounted thereto one end of a flexible sheathed cable or Bowden wire 72. Bracket 64 and bellcrank 66 are provided with like lost motion slots 74 arcuate about stud 68, with projecting pairs of tabs 76 and 78 being provided at opposite ends of the bracket and bellcrank slots respectively. A coil compression spring 80 of relatively high rate is caged within the slots 74, and seeks to align the slots and normally locate the bellcrank in a neutral position relative to the bracket, as shown in FIGURE 2. During induced relative rotation of the bellcrank in either direction, the spring is compressed between one moving bellcrank tab 78 and an opposite bracket tab 76, as indicated in FIGURE 3. Stops 66a on the bellcrank are alternately engageable with a stop 64a on the bracket to limit such relative rotation.

Figure 5:
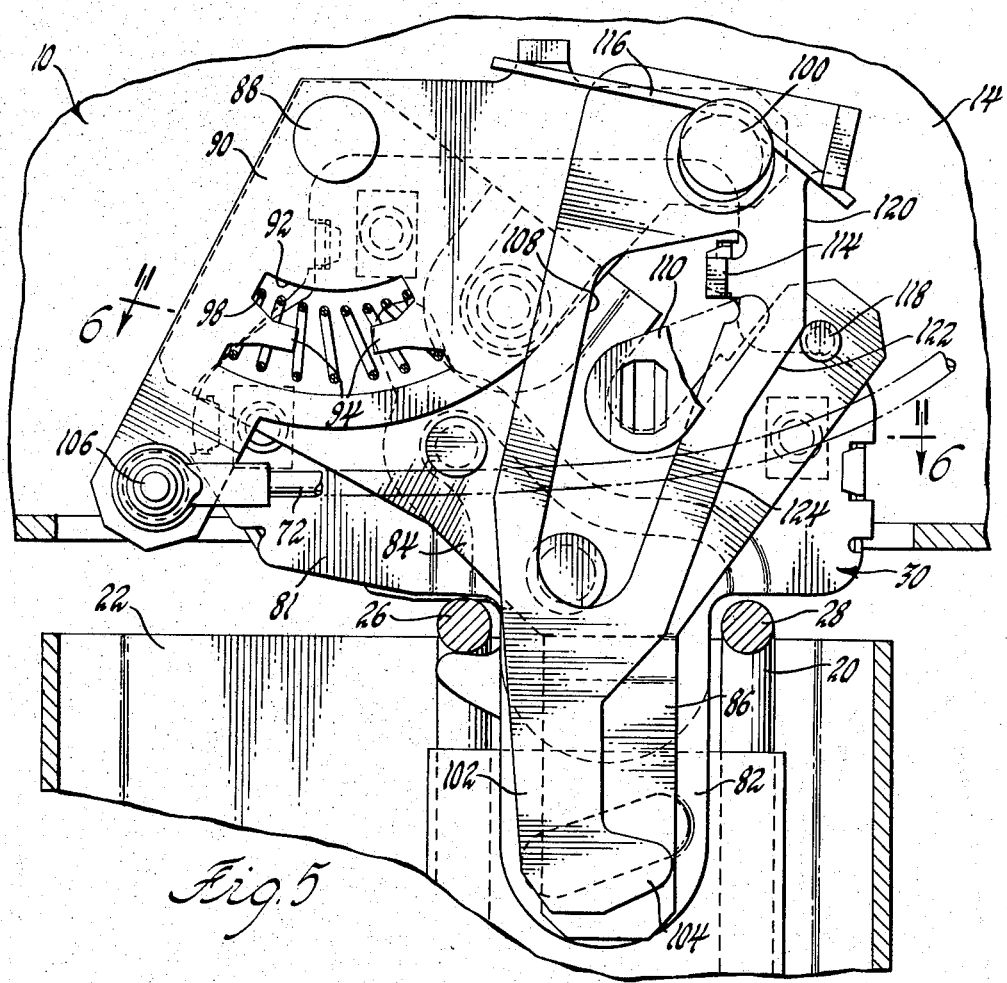
FIGURE 5 is an enlarged sectional view taken generally along the plane indicated by line 5—5 of FIGURE 2.

Referring now to FIGURE 5, a latch cover member 81 overlies the rearward face of latch 30 and includes an elongated and rounded tongue 82 adapted to extend between keeper portions 26 and 28 for transverse alignment of the deck lid in the fully closed position thereof. A bracket or base plate 84 overlies and is riveted or otherwise secured to cover 80 and includes a bearing tongue 86. A headed pivot stud 88 on the base plate rotatably mounts a second bellcrank 90 for rotation relative to the base plate, and again, the bellcrank and base plate include like lost motion slots 92 arcuate about stud 88 and partially defined by projecting pairs of tabs 94 and 96 on the base plate and bellcrank respectively. A coil compression spring 98 is again seated within slots 92 and over the tabs and normally aligns the slots and locates the bellcrank in a neutral position relative to the base plate as shown.

Figure 6:
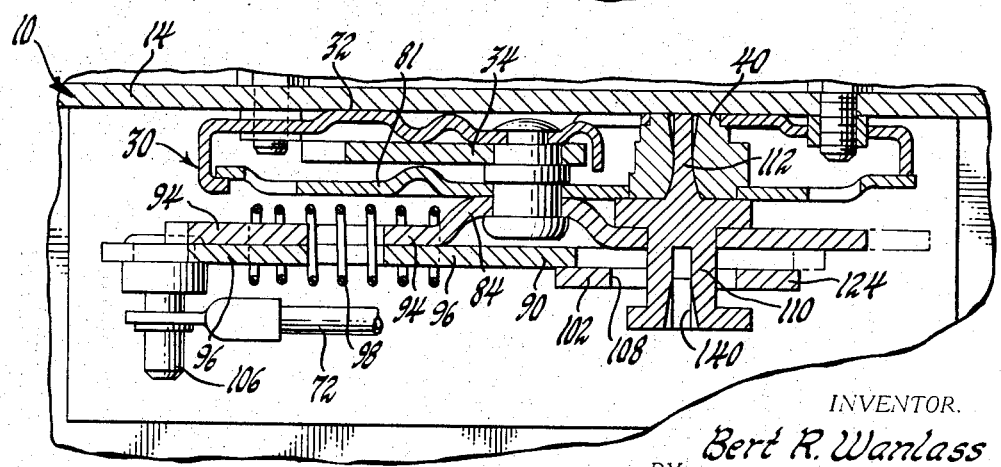
FIGURE 6 is a sectional view taken generally along the line 6—6 of FIGURE 5.

Bellcrank 90 includes a headed pivot stud 100 which rotatably mounts the upper end of an actuating or grapnel hook lever 102 formed with a hooked end 104. The other end of Bowden wire 72 extends across latch 30 and is anchored on a stud 106 on bellcrank 90. As is readily seen, the Bowden wire is operative to push and pull the bellcrank in clockwise and counterclockwise directions relative to the base plate, thereby to bodily shift lever 102 upwardly and downwardly relative to the latch 30. Lever 102 has a slot 108 through which is received a latch release rollback cam 110. As shown in FIGURE 6, cam 110 is rotatably mounted within base plate 84 and includes a tongue 112 received within the central aperture of cam 40 of latch 30. An actuating tab 114 is provided on lever 102 at the edge of slot 108 and extends rearwardly to overlie the ear of cam 110 for engagement therewith during downward shifting movement of lever 102 from a neutral position as shown. Such engagement serves to rotate the cam 110 and cam 40 to release latch bolt 34. A coil torsion spring 116 received over stud 100 is anchored at opposite ends to the bellcrank 90 and to lever 102 in a manner to bias the lever in a counterclockwise direction relative to the bellcrank. Such bias causes engagement between a guide pin 118 on base plate 84 and a series of cam edge surfaces 120, 122 and 124 on lever 102. As seen, this engagement orients lever 102 in a generally true vertical attitude relative to the bellcrank when in the neutral position shown. Any downward shifting movement of the lever under clockwise rotation of the bellcrank is similarly met with a true vertical attitude of the lever for efficient operation of cam 110, due to the straight cam surface 120. However, upward shifting movement of the lever under counterclockwise rotation of the bellcrank introduces the inclined cam surface 122 to pin 118 whereby the lever is permitted to rotate counterclockwise under the action of spring 116. The hooked end 104 is thereby located to be engageable with the rightward keeper portion 28 of striker 20 for a purpose which will later appear.

In operation, and assuming the deck lid 10 to be initially in fully closed position and in latched condition as shown in FIGURE 2, suitable switch means within the passenger compartment of the vehicle may be operated to cause energization of motor 48 to drive pinion 54 in a counterclockwise direction. Rack 58 is thereby driven upwardly, but is met with the prevention of deck lid 10 and bracket 64 from upward movement due to the latched condition of latch 30. Rack 58 thus causes clockwise lost motion or rotation of bellcrank 66 relative to bracket 64 as seen in FIGURE 3, which rotation compresses spring 80. Bowden wire 72 is accordingly pushed rearwardly and as shown in FIGURE 5, such rearward movement causes clockwise rotation of bellcrank 90 relative to the base plate compressing spring 98, and consequent downward shifting movement of lever 102. Cam surface 120 rides over pin 118 to hold the lever in generally vertical attitude, and tab 114 accordingly rotates cam 110 and cam 40 clockwise to release latch 30. The pressure of the compressed seal strip 18 is thereupon operative to push the deck lid upwardly, and this movement, aided by the compressed spring 80 and 98, serves to index the bellcranks 66 and 90 again in neutral relation. Springs 80 and 98 are thereafter sufficient to resist any subsequent relative movement in the two sets of brackets and bellcranks of the lost motion setup, and continued upward movement of rack 58 moves deck lid 10 to any desired open position.

To subsequently move the deck lid to fully closed position, motor 48 is energized in an opposite direction to rotate pinion 54 clockwise and to translate rack 58 downwardly, for example, from the fully open position of the deck lid as shown in broken lines in FIGURE 2. Springs 80 and 98 are again sufficiently strong to immediately resist relative movement between the bellcranks and brackets. When the deck lid reaches a partially open position approaching the fully closed position and whereat the marginal edges of the deck lid initially engage the uncompressed seal strip 18, the hooked end 104 of lever 102 has been introduced between keeper portions 26 and 28 and has preferably reached a position just slightly therebelow. At this point, any resistance from the seal strip, or otherwise, which is sufficient to overcome the centering action of spring 80 and the downward thrust of rack 58, causes counterclockwise lost motion or rotation of bellcrank 66 relative to bracket 64, which in turn causes a forward pull on Bowden wire 72. As seen in FIGURE 5, such forward pull will rotate bellcrank 90 counterclockwise to in turn bodily shift lever 102 upwardly from neutral position. This upward movement introduces pin 118 to cam surface 122, so that the lever is permitted to be rotated counterclockwise to engage the hooked end 104 under keeper portion 28. Continued resistance from the seal strip and the consequent continued rotation of bellcrank 90 causes further upward bodily shifting of the lever moving surface 124 over pin 18, and, as the lever 102 is hooked against movement relative to striker 20, the result is a downward movement about stud 100 of the bellcrank 90, latch 30, and deck lid 10. As the force in Bowden wire 72 is applied at a point remote from the hinge axis, i.e., over a moment arm nearly equaling the length of deck lid 10, the force of motor 48 is more than sufficient to finally move the deck lid downwardly against the seal strip until bolt 34 is rotated into latching and detented engagement with keeper portion 26. Upon deenergization of motor 48, as by a limit switch or otherwise, the solenoid clutch 57 or other reversibility means in gearing 52 permits the compressed springs 80 and 98 to return bellcranks 66 and 90 to neutral position. The system is then readied for a repeated opening mode as hereinbefore described.

It will be appreciated that by virtue of the solenoid clutch 57, or other reversibility means in gearing 52, deck lid 10 may be easily manually moved between its positions without resistance from the powered operating system. To release latch 30 in such an event, cam 110 is provided with a conventional recess 140 for receiving a transmission shaft of a conventional rotatable cylinder lock actuator mountable on the exterior of panel 12 adjacent the rearward edge thereof.

In FIGURE 8 there is shown a modification of the bellcranks and brackets for the pulldown and latch release apparatus wherein all parts are generally as heretofore described, with the exception that coil torsion springs 130 replace the compression springs 80 and 98 of the first embodiment. With reference to the bellcrank 90 and base plate 84 of FIGURE 8, spring 130 is mounted over pivot stud 88, and its opposed legs are prestressed and engaged over bent out tongue portions 134 and 136 of the base plate and bellcrank respectively. Tongue 134 extends through a slot 138 in the bellcrank and during any rotation of the bellcrank relative to the base plate in either direction, one leg of the spring is reacted by tongue 134 while the other is moved and further stressed by tongue 136, so that the spring always seeks to return the bellcrank to the neutral position shown. The similar application of such a spring to bellcrank 66 and bracket 64 is believed obvious. It will be appreciated that other similar resilient centering means may be used, such as cylinder caged compression springs mounted on the deck lid and operative upon the bellcranks through shiftable piston rods.

Thus a new and improved closure operating system is provided.

I claim:

1. In a vehicle body having a closure member movable between fully open and fully closed positions relative to a body member, and cooperable latch and striker means mounted on said members to be interengageable in the fully closed position of said closure member to hold said closure member therein, closure pulldown means comprising, grapnel hook means, means mounting said grapnel hook means on one of said members for bodily movement between extended and retracted positions, keeper means on the other of said members, said grapnel hook means in the extended position thereof being engageable with said keeper means when said closure member is moved to a partially open position thereof, and means responsive to said movement of said closure member to the partially open position thereof for engaging said grapnel hook means with said keeper means and moving said grapnel hook means from the extended to the retracted position thereof thereby to move said closure member from the partially open to the fully closed position thereof for interengagement of said latch and striker means.

2. In a vehicle body having a closure member movable between fully open and fully closed positions relative to a body member, latch means mounted on one of said members, and striker means mounted on the other of said members and engageable by said latch means in the fully closed position of said closure member to hold said closure member therein, the combination comprising, a grapnel hook mounted on said other member for bodily shiftable movement between extended and retracted positions relative thereto, said grapnel hook including means thereon engageable in the extended position of said grapnel hook with said striker means when said closure member is moved to an intermediate partially open position thereof approaching said fully closed position and means responsive to said movement of said closure member to the partially open position thereof for engaging said grapnel hook with said striker means and shifting said grapnel hook from the extended to the retracted position thereof thereby to move said closure member from the partially open to the fully closed position thereof for interengagement of said latch means and said striker means.

3. In a vehicle body having a body closure member movable between fully open and fully closed positions relative to a stationary body member, and latch means for holding said closure member in fully closed position, the combination comprising, an actuating member, means mounting said actuating member on one of said body members for bodily movement to a plurality of operative positions relative thereto, keeper means on the other of said body members, latch release means operable upon said latch means, said actuating member including means engageable in a first operative position of said actuating member with said keeper means when said closure member is in an intermediate partially open position thereof approaching said fully closed position, and power-operated means for moving said actuating member relative to said one body member, said power-operated means being operable in the fully closed position of said closure member to move said actuating member to a second operative position engaging said latch release means for release of said latch means, said power-operated means in response to movement of said closure member to the partially opened position thereof being operable to move said actuating member from the first to a third operative position thereof to engage said actuating member with said keeper means and move said closure member from the partially open to the fully closed position thereof for engagement of said latch means with said striker means.

4. In a vehicle body having a closure member movable between fully open and fully closed positions relative to a body member, and cooperable latch and striker means interengageable in the fully closed position of said closure member to hold said closure member therein, the combination comprising, movable operating means interconnecting said closure member and said body member, means for moving said operating means in one direction to move said closure member between fully closed and fully open positions and in another direction to move said closure member between fully open and partially open positions, movable latch release means, closure pulldown means mounted on one of said members for movement to engage the other of said members and move said closure member from the partially open to the fully closed position thereof, and motion transmitting means interconnecting said operating means with said latch release means and said pull-down means, said motion transmitting means permitting initial movement of said operating means in said one direction independently of movement of said closure member which independent movement moves said latch release means to release said latch means, said motion transmitting means further permitting similar indepedent movement of said operating means in said other direction subsequent to movement of said closure member to the partially open position thereof which independent movement moves said pulldown means to engage and move said closure member from the partially open to the fully closed position thereof.

5. In a vehicle body having a closure member movable between fully open and fully closed positions relative to a body member, and cooperable latch and striker means interengageable in the fully closed position of said closure member to hold said closure member therein, the combination comprising, a movable operating member interconnecting said closure member and said body member, means for moving said operating member in one direction to move said closure member between fully closed and fully open positions and in another direction to move said closure member between fully open and partially open positions, movable latch release means, closure pulldown means mounted on one of said members for movement between extended and retracted positions, said pulldown means in the extended position thereof being engageable with the other of said members when said closure member is in the partially open position thereof, and means operably connecting said operating member to said latch release means and said pulldown means, said connecting means including first lost motion means intermediate said operating member and said latch release means and being operable to permit initial movement of said operating member in said one direction independently of movement of said closure member which independent movement moves said connecting means and said latch release means to release said latch means, said connecting means further including second lost motion means intermediate said operating member and said pulldown means and being operable to permit similar independent movement of said operating member in said opposite direction subsequent to movement of said closure member to the partially open position thereof which independent movement moves said connecting means to move said pulldown means from the extended to the retracted position thereof to engage said other member and move said closure member from the partially open to the fully closed position thereof.

6. In a vehicle body having a closure member movable relative to a body member between fully open and fully closed positions, and cooperable latch and striker means interengageable in the fully closed position of said closure member, the combination comprising, an extendable and retractable operating member interconnecting said closure member and said body, means for extending said operating member to move said closure member between fully closed and fully open positions and retracting said operating member to move said closure member between fully open and partially open positions, movable latch release means, grapnel hook means mounted on one of said members for bodily movement between extended and retracted positions, said grapnel hook means in the extended position thereof being engageable with the other of said members when said closure member is in the partially open position thereof, and means operably connecting said operating member to said latch release means and said grapnel hook means, said connecting means including first lost motion means intermediate said operating member and said latch release means and being operable to permit initial extension of said operating member independently of movement of said closure member which independent extension moves said connecting means and said latch release means to release said latch means, said connecting means further including second lost motion means intermediate said operating member and said grapnel hook means and being operable to permit similar independent retraction of said operating member subsequent to movement of said closure member to the partially open position thereof which independent retraction causes said connecting means to move said grapnel hook means from the extended to the retracted position thereof to engage said other member and move said closure member from the partially open to the fully closed position thereof for interengagement of said latch and striker means.

7. In a vehicle body having a closure member movable between fully open and fully closed positions relative to a body member, the combination comprising, latch means mounted on one of said members, striker means mounted on the other of said members and engageable by said latch means in the fully closed position of said closure member to hold said closure member therein, an extendable and retractable operating member adapted to be connected to said closure, means for extending said operating member to move said closure member between fully closed and fully open positions and for retracting said operating member to move said closure member between fully open and partially open positions, movable latch release means operable upon said latch means, a grapnel hook mounted on said other member for bodily shiftable movement between extended and retracted positions relative thereto, said grapnel hook including first means thereon engageable in the extended position of said grapnel hook with said striker means when said closure member is moved to said partially open position thereof, said grapnel hook including second means thereon operable upon said latch release means, lost motion means connecting said operating member to said closure member, and means operably connecting said lost motion means to said grapnel hook, said lost motion means permitting initial extension of said operating member independently of movement of said closure member which independent extension moves said operable connecting means and said grapnel hook in one direction to engage said second means with said latch release means to release said latch means, said lost motion means further permitting similar independent retraction of said operating member subsequent to movement of said closure member to the partially open position thereof which independent retraction moves said operable connecting means to move said grapnel hook from the extended to the retracted position thereof whereby to engage said first means with said striker means and move said closure member from the partially open to the fully closed position thereof for interengagement of said latch means and said striker means.

8. The combination recited in claim 7 wherein said lost motion means includes a connecting member movably mounted on said closure member and having connection to said operating member, and centering spring means interposed between said connecting member and said closure member to normally locate said member in a resiliently centered neutral position, extension of said operating member causing movement of said connecting member in one direction from said neutral position to cause said operable connecting means to effect said latch release by said grapnel hook, retraction of said operating member causing movement of said connecting member in the other direction from said neutral position to cause said operable connecting means to effect said movement of said closure member from partially open to fully closed position by said grapnel hook.

9. The combination recited in claim 7 further including bellcrank means pivotally mounted on said other member, and centering spring means connected between said bellcrank means and said other member to normally locate said bellcrank member in a resiliently centered neutral position relative to the latter, said grapnel hook being pivotally mounted on said bellcrank means and being shiftable by pivotal movement of said bellcrank means from said neutral position thereof, movement of said bellcrank means in one direction from neutral position moving said grapnel hook in said one direction for said latch release, movement of said bellcrank means in the opposite direction from neutral position moving said grapnel hook from extended to retracted position.

10. The combination recited in claim 9 further including cooperative cam means on said grapnel hook and on said other member operable to control pivoting of said grapnel hook on said bellcrank means for engagement of said first and second means with said striker means and said latch release means respectively.

11. The combination as recited in claim 9 wherein said operable connecting means includes push-pull cable means operable in a push stroke thereof effected by extension of said operating member to cause said pivotal movement of said bellcrank means in said one direction from neutral position, said cable means being operable in a pull stroke thereof effected by retraction of said operating member to move said bellcrank means in the said other direction from neutral position..

References Cited

UNITED STATES PATENTS

| | | | |
|---|---|---|---|
| 2,833,536 | 5/1958 | Joachim et al. | 49—280 |
| 3,145,988 | 8/1964 | Colautti et al. | 49—280 |

J. K. BELL, *Assistant Examiner.*

DAVID J. WILLIAMOWSKY, *Primary Examiner.*